Jan. 22, 1963 W. C. ALLMAND 3,074,289
CONSTANT OUTPUT DRIVE
Filed March 14, 1960 2 Sheets-Sheet 1

INVENTOR
Walter C. Allmand,
BY
ATTORNEYS

Jan. 22, 1963 W. C. ALLMAND 3,074,289
CONSTANT OUTPUT DRIVE
Filed March 14, 1960 2 Sheets-Sheet 2

INVENTOR
Walter C. Allmand,
BY Diggins + LeBlanc
ATTORNEYS though the drive belt 24.

United States Patent Office
3,074,289
Patented Jan. 22, 1963

3,074,289
CONSTANT OUTPUT DRIVE
Walter C. Allmand, 311 W. 4th Ave., Holdrege, Nebr.
Filed Mar. 14, 1960, Ser. No. 14,829
7 Claims. (Cl. 74—230.17)

This invention relates to constant output drives and more particularly is concerned with a completely mechanical variable input, constant output linkage for driving electrical generators and similar constant speed units.

While constant speed output devices of a wide variety of types are well known they invariably utilize some type of complicated hydraulic or electric component substantially increasing the overall cost of the unit. The system of the present invention avoids this disadvantage by providing a simple mechanical construction providing a relatively inexpensive unit.

The constant speed drive of the present invention is an automatically self-adjusting speed ratio power transmission completely non-sparking and safe for operation under hazardous conditions. The unit is entirely speed sensitive, has rapid recovering after input speed changes and may operate through a much wider temperature range than known devices. The input shaft can be rotated in either direction and the unit operates equally as well in a level position or tilted as much as 15 degrees in any direction. In addition, positive protection is provided against over voltage or over speed of the output shaft during recovery after change in speed of the input shaft.

It is therefore a primary object of the present invention to provide a novel constant speed output drive.

Another object of the present invention is to provide a completely mechanical variable input constant output transmission.

Another object of the present invention is to provide an improved constant output device of relatively simple inexpensive construction.

Another object of the present invention is to provide an improved constant output device of increased ruggedness and versatility of application.

These and other objects and advantages of the invention will be more apparent upon reference to the following specification, claims and appended drawings wherein:

Figure 1:
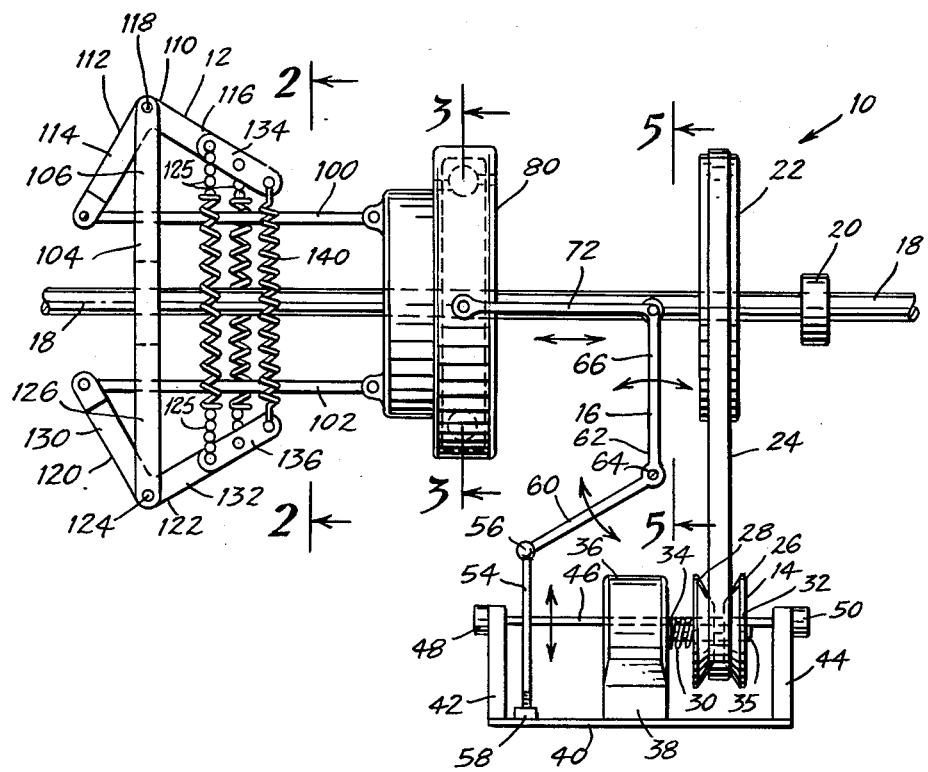
FIGURE 1 shows the overall variable input, constant output drive of the present invention.

Referring to the drawings, the variable input constant output drive of the present invention generally indicated at 10 comprises as main components thereof a centrifugal governor 12, a variable pitch drive 14 and a linkage 16 enabling the governor to actuate the variable pitch drive. The unit includes an input shaft 18 rotatable in a suitable bearing 20 and carrying a pulley wheel 22 around which passes a drive belt 24.

The lower end of pulley belt 24 passes about a variable pitch pulley 26 on shaft 35 having a movable cone shaped pulley plate 28 biased by spring 30 towards the other cone shaped plate 32 of pulley 26. Spring 30 surrounds generator shaft 35 and preferably bears on and is connected at one end to a flat plate 34 mounted on the adjacent side of a generator 36. Pulley 22 is preferably a flat faced pulley while belt 24 is a wide cogged type W belt especially suited for use with variable pitch pulleys such as pulley 26.

Figure 6:
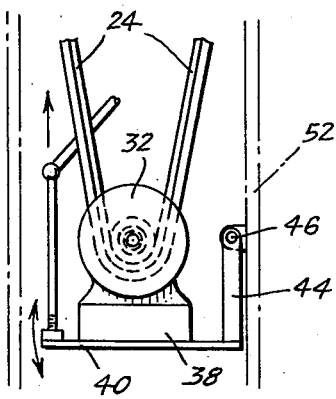
FIGURE 6 is an end view showing the output portion and tiltable platform of the drive of FIGURE 1.

As best seen in FIGURES 1 and 6, generator 36 is mounted on a base 38 supported by a platform 40. Platform 40 carries a pair of spaced rigid standards 42 and 44 along one edge pivoted to an elongated rod 46 received at each end in brackets 48 and 50. The brackets project outwardly from a suitable supporting wall or the like indicated by the dashed lines 52 in FIGURE 6.

Figure 5:
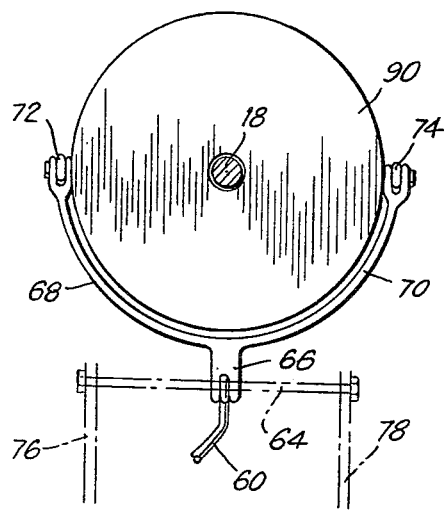
FIGURE 5 is a cross-section taken along line 5—5 of FIGURE 1.

Connected to the edge of platform 40 remote from the pivot rod 46 is a lift rod 54 received at its upper end in a ball and socket joint 56 and at its lower end in a similar universal connection 58 coupled to the platform 40. The socket portion of joint 56 on the end of a lever 60 forming one arm of a bell crank lever 62, pivoted at 64 and carrying a second bell crank lever arm 66. The bell crank lever arm 66 is in the form of a yoke or fork and includes outwardly extending fork arms 68 and 70 best seen in FIGURE 5 pivotally joined to the ends of two connecting links 72 and 74. The bell crank lever is pivoted about rod 64 between suitable support means indicated by the dashed lines 76 and 78 in FIGURE 5.

Figure 3:
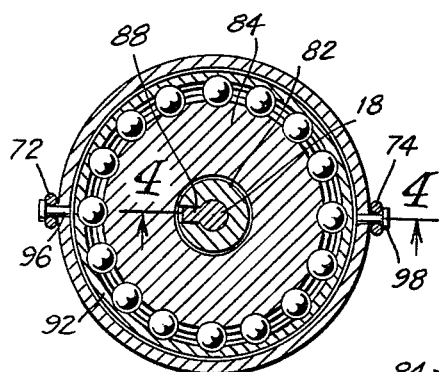
FIGURE 3 is a cross-section through the thrust bearing taken along line 3—3 of FIGURE 1.
Figure 4:
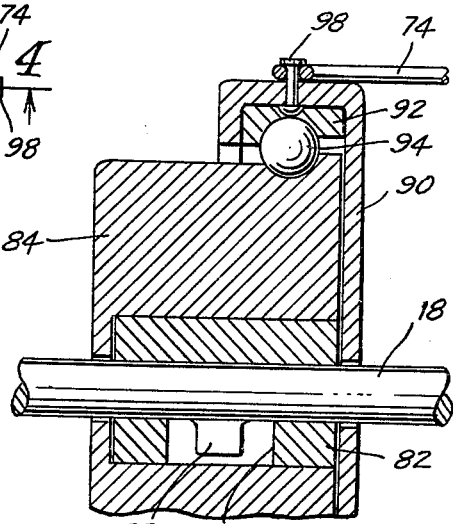
FIGURE 4 is a horizontal cross-section through a portion of the thrust bearing taken at right angles to that of FIGURE 3.

A thrust bearing assembly 80 shown in FIGURES 1, 3 and 4 comprises a bronze bushing 82 encased by a press fit or other suitable means within a steel tube 84 so that the bushing and tube rotate as a single unit. The bushing is formed with a slot 86 forming a keyway receiving the projection or key 88 formed on shaft 18. By means of the keyway bushing 82 and tube 84 are rotatable with shaft 18 but are free to slide longitudinally along the axis of the shaft to the limits of slot 86.

Surrounding tube 84 is a bearing housing 90 carrying the outer race 92 of a ball bearing 94. The inner race of bearing 94 is formed in the outer surface of the steel tube 84. Bearing housing 90 is stationary and is held against rotation by connecting links 72 and 74 which are joined to the outer surface of the bearing housing by rivets 96 and 98.

Figure 2:
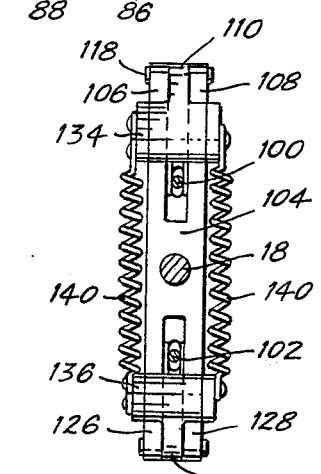
FIGURE 2 is a cross-section along the line 2—2 of FIGURE 1.

Tube 84 is connected to the centrifugal governor 12 through thrust rods 100 and 102 as shown in FIGURE 1. The governor as shown in FIGURES 1 and 2 comprises a vertical generally H-shaped body 104 suitably carried for rotation by and rigidly secured to the shaft 18. The upper spaced arms 106 and 108 receive the central tongue portion 110 of a lever 112 having rigid downwardly extending arms 114 and 116 connected at approximately right angles to each other. The lever 112 is pivoted to the upper arms 106 and 108 of body 104 by a pivot pin 118. A lower rigid lever 120 similarly includes a central tongue portion 122 pivoted by a pin 124 to the spaced lower arms 126 and 128 of body 104. Lever 120 includes upwardly extending arms 130 and 132 rigidly joined at approximately right angles to each other.

The thrust links 100 and 102 are pivoted to the outer ends of lever arms 114 and 130 respectively, while the opposite lever arms 116 and 132 carry weights 134 and 136 in the form of flat plates, preferably in pairs joined to opposite sides of the lever arms 116 and 132. Joining these lever arms are a plurality of coil springs 140 indicated in FIGURE 1 as three in number. More or less coil springs can be joined to the opposite lever arms 116 and 132 if desired.

In operation, rotation of driven shaft 18 causes the weights 134 and 136 on the ends of lever arms 116 and 132 to move outwardly under the influence of centrifugal force against the resilient force of the springs 140. Outward movement of these lever arms since they are pivoted about the outer ends of body 104 carried by the shaft 118 is transmitted to the opposite lever arms 114 and 130 in the form of rotational motion having an axial component which acts through the thrust rods 100 and 102. These latter are pivoted at their opposite ends to the levers and to the tube 84 so as to slide the tube longitudinally along the axis of shaft 18. Outward movement of the weights 134 and 136 as seen in FIGURE 1 causes the tube 84 and entire thrust bearing assembly 80 to move to the right as shown in FIGURE 1.

The axial movement of the thrust bearing is transmitted to the stationary bearing housing through rods 72 and 74 to the fork arms 68 and 70 of the bell crank lever 72. Movement of the arms 68 and 70 to the right in FIGURE 1 in the direction of the arrows about pivot 64 causes lower arm 60 to move upwardly as also indicated by the arrows in FIGURE 1. Arm 60 carries with it lift rod 54 which in turn carries the free edge of platform 40 as indicated by the arrows in FIGURE 6. As a result, the free edge of platform 40 moves upwardly about pivot rod 46 and carries with it the generator 36 and the lower pulley 14.

Upward movement of pulley 26 brings the two pulleys 26 and 22 closer together so as to produce a temporary slack in the belt 24. However, this slack is immediately taken up by movement of pulley plate 28 in the direction of adjacent pulley plate 32 under the influence of coil spring 30 bearing at one end on pulley plate 28 and at its other end on plate 34 carried by the generator 36. Relative movement of the conical plates 28 and 32 to bring them closer together decreases the depth of the V-shaped groove formed by the adjacent conical plates and acts to increase the effective diameter of lower pulley 26. As a result the ratio between pulleys 22 and 26 is varied so that the drive relationship between shaft 18 and generator shaft 35 upon which pulley 26 is mounted is likewise varied with the increased diameter of pulley 26 tending to decrease the rotational speed of the output generator shaft 35 in relation to the speed of drive shaft 18.

A reduction in the speed of drive shaft 18 tends to cause the weights to be brought closer together under the influence of springs 140 and acts through the linkages described to lower the platform 40 moving the pulleys 22 and 26 further apart so as to effectively reduce the diameter of pulley 26 and increase the relative rotational speeds between the input or drive shaft 18 and the output or generator shaft 35.

In a specific application a contractor may wish to use a 2.5 kilowatt generator which must operate at a constant speed of 1800 r.p.m. (plus or minus 5%) from a drag line engine. In order to operate the drag line, the drag line shaft must vary in speed from a minimum of 400 r.p.m. to a maximum of 1200 r.p.m.

Assuming that the drag line engine is belted to drive shaft 18 in a one to one ratio, when the engine is idling at 400 r.p.m. shaft 18 and the governor assembly 12 both turn at the same 400 r.p.m. The governor weights and springs are so chosen that the weights at this speed do not yet start to fly out but are retained by the springs 140. When the contractor's source reaches a speed of 600 r.p.m. shaft 18 has increased in speed enough to cause the governor weights to travel in a larger diameter circle. This moves thrust assembly 80 actuating the linkage between the thrust assembly and the generator platform so as to move the generator and vary the diameter of pulley 26 in the manner described. This has the effect of making belt 24 longer, causing it to ride further from the center of the variable pulley thus increasing the pitch diameter of the pulley. Consequently, the ratio between the pulley 26 and pulley 22 results in a constant speed of the generator shaft 35. This action can be continued throughout the speed range up to 1200 r.p.m. and in a reverse direction when the contractors power source is slowed down to 400 r.p.m.

It can be seen that as the governor weights increase in speed and increase the diameter of the circle through which they travel, they may develop an outward thrust at a higher rate than needed. In order to compensate for this effect and absorb the extra power it is possible to use different springs of various strength and weight connected to the governor weights by short pieces of chain such as 125 shown in FIGURE 1 or other suitable means so that they come into effect in series as the governor weights move out to travel in a larger circle. For example, in one arrangement, spring set No. 1 was stretched to a tension of 50 pounds to hold the governor weights against stops up to a minimum operating speed of 400 r.p.m. At about 600 r.p.m. the governor weights moved out one-half inch and at this point spring set No. 2 became taut. At about 850 r.p.m., the governor weights moved out another one-half inch and spring set No. 3 became taut. In this way the holding power of the governor spring assembly becomes increasingly greater as the governor weights move out into a larger circle. The springs may be arranged to come into play in pairs or singly as desired. It is of course possible to use a larger or smaller number of springs in any particular arrangement required.

It is apparent that the particular governor arrangement, the thrust bearing and the manner of moving the platform 40 may be varied in conventional ways through variations of the linkages and the like. The output shaft 34 may be connected to units other than electrical generators, which other units are then driven at the constant speed of output shaft 35. In this case it is possible to use a variable pitch pulley for both the pulley 26 and pulley 22 which are then both automatically adjusted by suitable springs so as to vary the pitch diameter to accomodate the mean or effective belt length resulting from the mean pitch diameter of the variable pitch pulley on the input shaft 18 as well as on the output shaft 35.

The present invention provides a novel variable input, constant output drive coupling which is an automatically self-adjusting speed ratio power transmission. The construction is a relatively simple inexpensive mechanical arrangement making it possible to completely eliminate hydraulic and electric components. The unit is completely non-sparking and safe for operation under hazardous conditions and can be operated throughout a much wider temperature range than known units. It is entirely speed sensitive and provides for rapid recovery after input speed changes. An important feature is that the input shaft can be operated in either direction. The unit operates in a level position or tilted as much as 15 degrees in any direction and provides positive protection against over-voltage or over-speed of the output shaft during recovery after a change in speed of the input shaft.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A constant output drive comprising a drive shaft, a pulley mounted on said drive shaft, a driven shaft, a variable pitch pulley having spaced sections mounted on said driven shaft, resilient means urging one of said variable pitch pulley sections toward the other section, an endless belt passing around each of said pulleys, a governor including centrifugal weights carried by said drive shaft, a thrust bearing having an inner portion rotatable with and slidably movably along said drive shaft and having an outer non-rotatable portion carried by said inner portion, lever means connecting said governor weights and said thrust bearing for converting the radial movement of said weights into longitudinal movement of said thrust bearing, a platform pivoted along one edge supporting said output shaft, and a mechanical linkage including a bell crank lever connecting said thrust bearing to the edge of said platform remote from said pivoted edge for converting the sliding movement of said thrust bearing into pivotal movement of said platform toward and away from said drive shaft, whereby said endless belt and said resilient means act against each other to move said section of said variable pitch pulley to vary the mean diameter of said pulley in a direction to maintain the rotational speed of said driven shaft constant.

2. A drive according to claim 1 wherein radial movement of said governor weights is resisted by a plurality of springs which are successively stressed to compensate for increased outward thrust of the governor weights at high speeds.

3. A drive according to claim 2 wherein said springs are of different lengths and are attached at each end to spaced portions of a pivoted lever arm carrying one of the governor weights.

4. A drive according to claim 1 wherein said thrust bearing comprises a bronze bushing keyed to said drive shaft, a steel tube incasing said bushing and rotatable therewith, a bearing housing and an antifriction bearing separating said tube and said housing.

5. A drive according to claim 4 including a pair of connecting links joined to opposite sides of said bearing housing and to a pair of fork arms forming a portion of said bell crank lever.

6. A drive according to claim 5 wherein said driven shaft is coupled to an electric generator mounted on said platform.

7. A constant output drive comprising a drive shaft and a driven shaft, a variable pitch pulley mounted on said drive shaft, a fixed pulley mounted on said driven shaft, an endless belt coupling said pulleys, a centrifugal governor mounted on said driven shaft, said governor including a pair of radially movable pivotally mounted weights, successively stretchable spring means attached at each end to said weights by short flexible links of chain for resisting radial movement of said weights whereby outward movement of said weights bring successive ones of said spring means under stress, and lever means coupling said weights to said variable pitch pulley mounted on said drive shaft whereby the pitch of said pulley is varied in accordance with the radial position of said governor weights.

References Cited in the file of this patent

UNITED STATES PATENTS

| | | |
|---|---|---|
| 1,260,922 | Leissner | Mar. 26, 1918 |
| 1,698,831 | Titus | Jan. 15, 1929 |
| 2,308,868 | Durdin | Jan. 19, 1943 |
| 2,479,764 | Morton et al. | Aug. 23, 1949 |
| 2,512,816 | Sweger | June 27, 1950 |
| 2,786,667 | Gaubatz | Mar. 26, 1957 |

FOREIGN PATENTS

| | | |
|---|---|---|
| 548,600 | France | Jan. 18, 1923 |
| 714,094 | France | Aug. 31, 1931 |